(12) United States Patent
Priddle et al.

(10) Patent No.: US 8,831,402 B2
(45) Date of Patent: Sep. 9, 2014

(54) MEDIA STREAM PROCESSING

(75) Inventors: Clinton Priddle, Indooroopilly (AU);
Torbjorn Einarsson, Stockholm (SE);
Magnus Westerlund, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 513 days.

(21) Appl. No.: 12/999,036

(22) PCT Filed: Nov. 27, 2008

(86) PCT No.: PCT/SE2008/051364
§ 371 (c)(1),
(2), (4) Date: Dec. 14, 2010

(87) PCT Pub. No.: WO2009/154529
PCT Pub. Date: Dec. 23, 2009

(65) Prior Publication Data
US 2011/0103766 A1    May 5, 2011

Related U.S. Application Data

(60) Provisional application No. 61/061,725, filed on Jun. 16, 2008.

(51) Int. Cl.
| | | |
|---|---|---|
| *H04N 9/80* | (2006.01) | |
| *H04N 19/142* | (2014.01) | |
| *H04N 19/67* | (2014.01) | |
| *H04N 21/43* | (2011.01) | |
| *H04N 21/845* | (2011.01) | |
| *H04N 21/8547* | (2011.01) | |
| *H04N 19/107* | (2014.01) | |
| *H04N 19/172* | (2014.01) | |
| *H04N 19/61* | (2014.01) | |
| *H04N 19/46* | (2014.01) | |
| *H04N 5/783* | (2006.01) | |
| *H04N 7/173* | (2011.01) | |
| *H04L 29/06* | (2006.01) | |

(52) U.S. Cl.
CPC ........... *H04N 19/00163* (2013.01); *H04N 9/80* (2013.01); *H04N 19/00866* (2013.01); *H04N 21/4307* (2013.01); *H04N 21/845* (2013.01); *H04N 21/8547* (2013.01); *H04N 19/0003* (2013.01); *H04N 19/00266* (2013.01); *H04N 19/00781* (2013.01); *H04N 19/00545* (2013.01); *H04L 65/607* (2013.01); *H04L 65/80* (2013.01); *H04L 69/28* (2013.01)
USPC ........................................... 386/241; 725/93

(58) Field of Classification Search
CPC ......... H04N 5/783; H04N 5/781; H04N 5/91; H04N 5/76; H04N 7/173; H04N 7/24; H04N 7/32; H04N 5/44; H04N 7/25; H04N 7/10; H04L 12/56; H04L 29/06
USPC ............... 386/241, 343–352, 322, 68, 69, 70, 386/111, E09.011, E09.028, E05.028; 715/503, 515, 530
See application file for complete search history.

(56) References Cited

U.S. PATENT DOCUMENTS

| | | | | |
|---|---|---|---|---|
| 5,535,008 | A | | 7/1996 | Yamagishi et al. |
| 5,745,645 | A | * | 4/1998 | Nakamura et al. ............. 386/233 |
| 6,119,213 | A | * | 9/2000 | Robbins ........................ 711/202 |
| 6,816,492 | B1 | | 11/2004 | Turner et al. |
| 6,871,006 | B1 | * | 3/2005 | Oguz et al. ..................... 386/346 |
| 7,849,160 | B2 | * | 12/2010 | Hayward ........................ 709/219 |
| 2002/0124182 | A1 | * | 9/2002 | Bacso et al. ................... 713/200 |
| 2003/0231867 | A1 | * | 12/2003 | Gates et al. ...................... 386/69 |
| 2004/0019911 | A1 | | 1/2004 | Gates et al. |
| 2004/0252230 | A1 | | 12/2004 | Winder |
| 2005/0265694 | A1 | * | 12/2005 | Green et al. ..................... 386/68 |
| 2006/0029065 | A1 | | 2/2006 | Fellman |
| 2007/0028275 | A1 | * | 2/2007 | Lawrie ............................ 725/93 |
| 2007/0067480 | A1 | | 3/2007 | Beek et al. |
| 2007/0118850 | A1 | * | 5/2007 | Bertin ............................. 725/32 |
| 2008/0273858 | A1 | * | 11/2008 | Wald et al. ..................... 386/68 |
| 2009/0052863 | A1 | * | 2/2009 | Parmar et al. ................... 386/83 |
| 2009/0096632 | A1 | * | 4/2009 | Ullrich et al. ............... 340/825.2 |

FOREIGN PATENT DOCUMENTS

| | | |
|---|---|---|
| EP | 1585334 A1 | 10/2005 |
| JP | 2003264804 A | 9/2003 |
| JP | 2008017328 A | 1/2008 |
| WO | 2006/053949 A1 | 5/2006 |
| WO | 2006/096104 A1 | 9/2006 |
| WO | 2006/138472 A2 | 12/2006 |
| WO | 2007074361 A2 | 7/2007 |
| WO | 2008031263 A1 | 3/2008 |

OTHER PUBLICATIONS

3RD Generation Partnership Project. "Reduction of Tune-In Delay in MBMS Streaming." 3GPP TSG-SA4#33 Meeting, Tdoc S4-040743, Helsinki, Finland, Nov. 22-26, 2004.

Rezaei, M. et al., "Tune-in Time Reduction in Video Streaming Over DVB-H", IEEE Transactions on Broadcasting, Mar. 2007, pp. 320-328, vol. 53, No. 1, IEEE Service Center, Piscataway, NJ, US.

Fuchs, H. et al, "Optimizing channel change time in IPTV applications", IEEE International Symposium on Broadband Multimedia Systems and Broadcasting, Mar. 31, 2008, pp. 1-8, IEEE, Piscataway, NJ, US.

\* cited by examiner

*Primary Examiner* — Dave Czekaj
*Assistant Examiner* — Dramos I Kalapodas
(74) *Attorney, Agent, or Firm* — Coats & Bennett, PLLC

(57) ABSTRACT

A stream (1) of media frames (12-16, 22-26, 32-36) is generated by providing multiple media frames (22-26) having respective assigned default timestamps (40) defining rendering times of the media data of the media frames (22-26) according to a default rendering time schedule. Respective alternative timestamps (50) are assigned to at least a portion of the media frames (22-26). These alternative timestamps (50) define alternative rendering times of the media data of the media frames (22-26) according to an alternative rendering time schedule. The alternative timestamps (50) can be used for providing an efficient media rendering when tuning in to the stream (1) at an intermediate position of a frame grouping (20) of the media frames (22-26) thereby missing some of the media frames (22, 24) of the frame grouping (20).

18 Claims, 7 Drawing Sheets

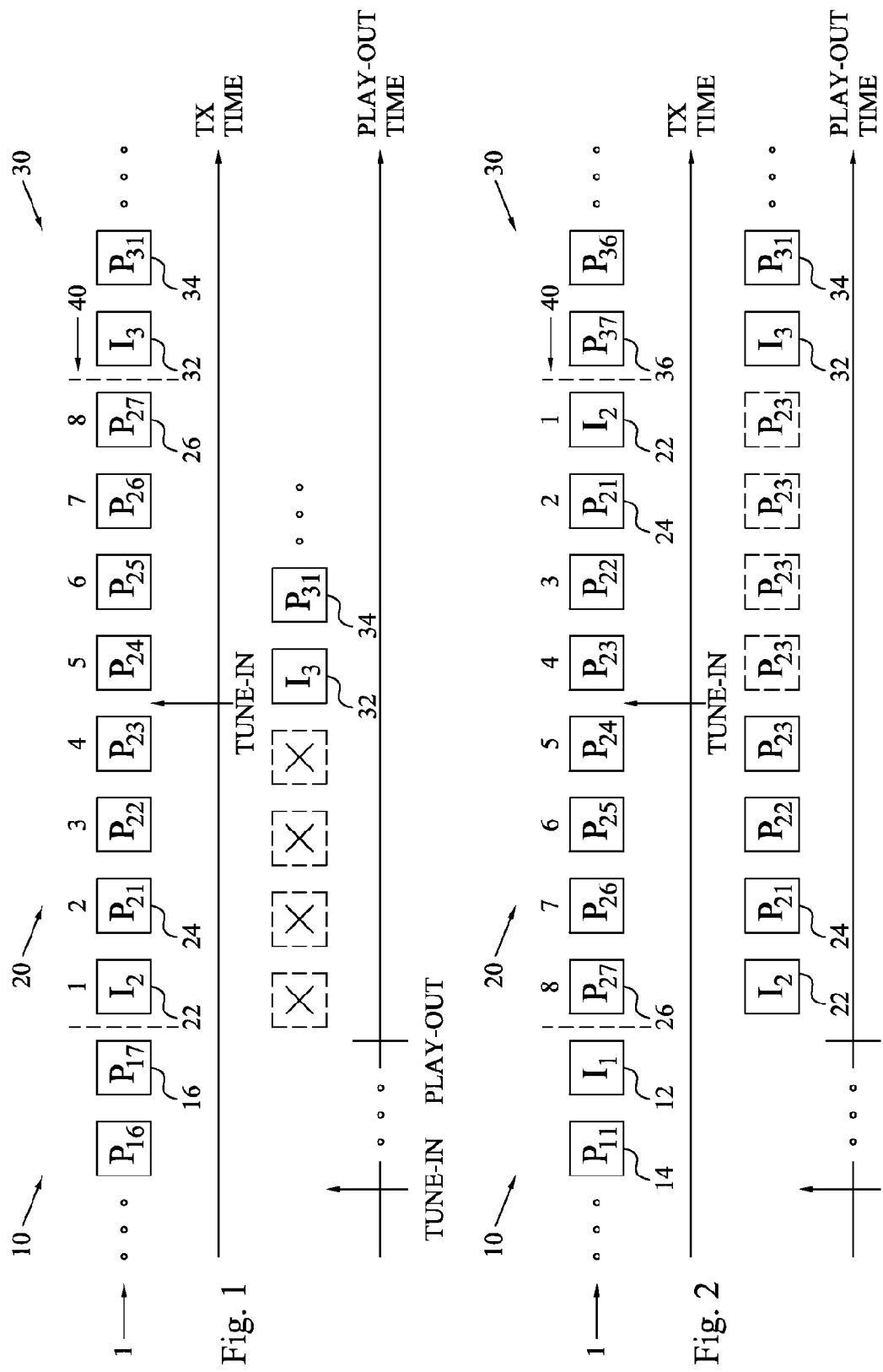

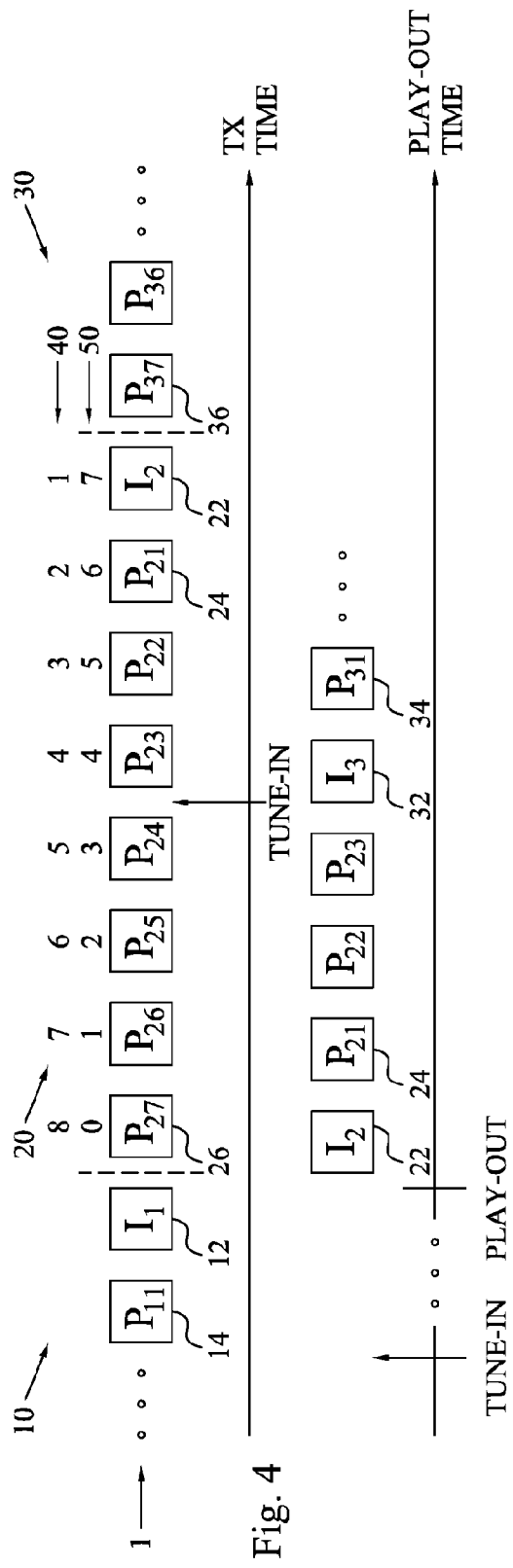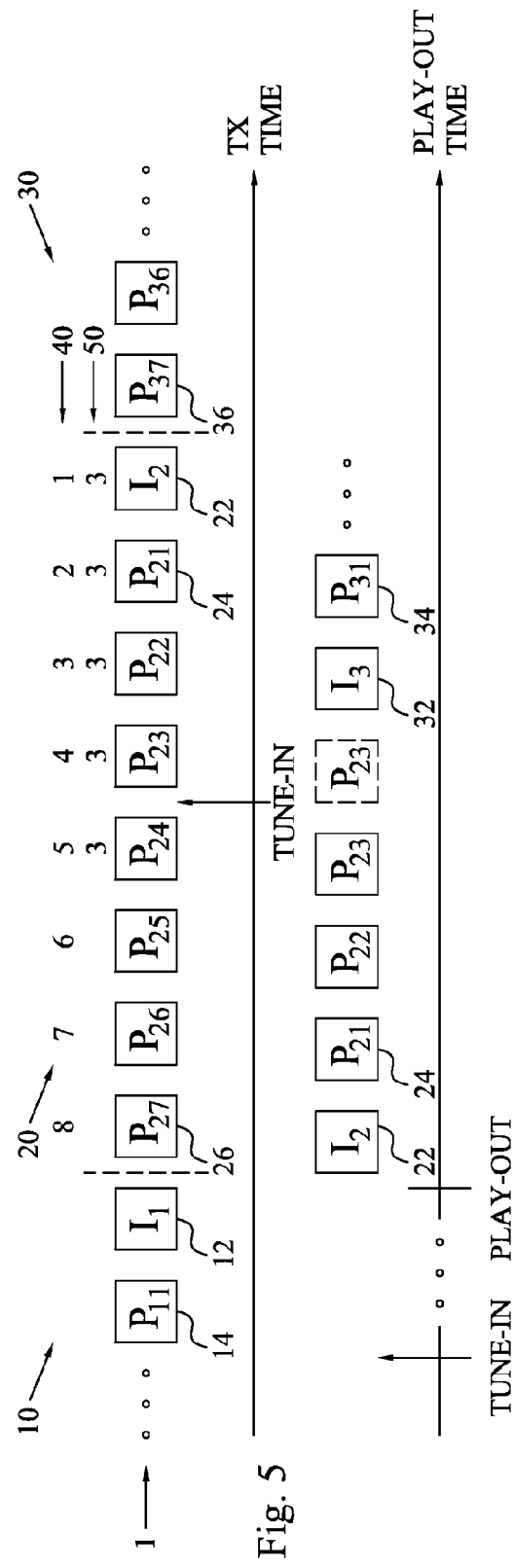

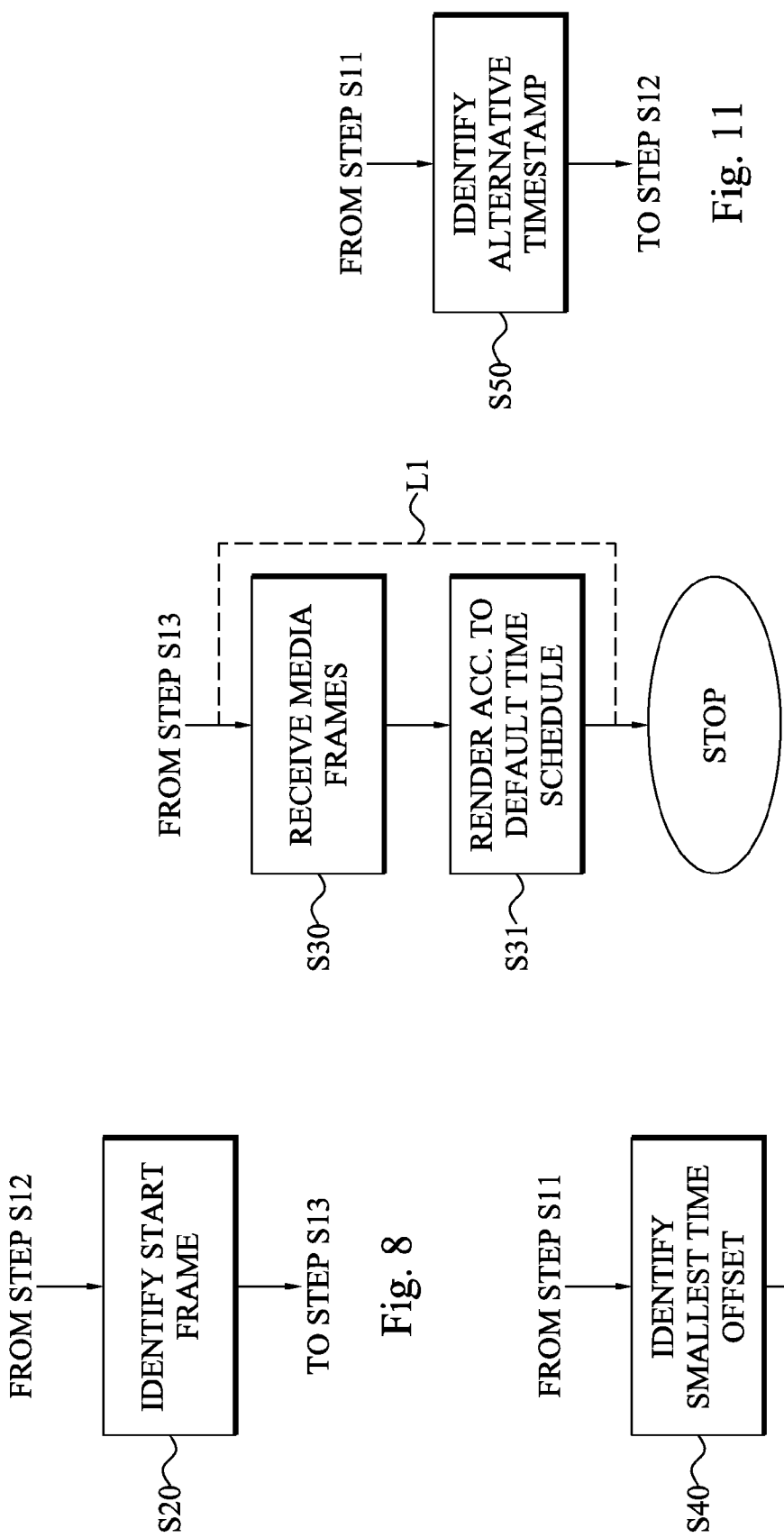

MEDIA STREAM PROCESSING

TECHNICAL FIELD

The present invention generally relates to processing and generating media streams comprising media frames with assigned timestamps.

BACKGROUND

Temporal and spatial redundancy can be exploited using predictions to make a compact representation of video and other types of media and multimedia possible. For instance, pixel prediction is an important part of video coding standards such as H.261, H.263, MPEG-4 and H.264. In H.264 there are three pixel prediction methods utilized, namely intra, inter and bi-prediction. Intra prediction provides a spatial prediction of the current pixels block from previously decoded pixels of the current frame. Inter prediction gives a temporal prediction of the current pixel block using a corresponding but displaced pixel block in a previously decoded frame. Bi-directional prediction gives a weighted average of two inter predictions. Thus, intra frames do not depend on any previous frame in the video stream, whereas inter frames, including such inter frames with bi-directional prediction, use motion compensation from one or more other reference frames in the video stream.

User terminals with media players can only start decoding and rendering the media data at intra frames. In order to enable tune-in into the video stream without too long delays, intra frames are typically sent periodically. However, intra frames are generally larger in terms of the number of bits as compared to inter frames, thereby significantly contributing to the overhead in the video stream.

Media frames and their frame-carrying data packets of a video stream are typically grouped together in the streams. For instance, in the case of systematic Forward Error Correction (FEC), the frame-carrying data packets are grouped together into different FEC blocks and sent along with repair information. Such a FEC block should begin, in decoding order, with an intra frame so that errors do no propagate between FEC blocks. This also avoids longer tune in times, i.e. the FEC tune-in and intra frame tune-in should be aligned.

FIG. 1 illustrates such a division of frames 16, 22-26, 32-34 into FEC blocks 10, 20, 30. In the drawing $I_2$ 22, $I_3$ 32 denote the initial intra frame of the FEC block 20, 30 number 2 and 3, respectively. $P_{ij}$ 16, 24, 26, 34 denotes inter frame number j of FEC block 10, 20, 30 number i. Each media frame 22-26 of a FEC block 20 has a respective timestamp 40 defining the rendering or play-out time schedule for the media in the FEC block 20.

Currently, the average tune-in time for traditional encoded sequence is 1.5× the FEC block size. Firstly, one must wait a whole FEC block to be able to perform FEC decoding. With a single intra frame per FEC block one needs to also wait, on average, an additional half FEC block to get the intra frame. This is because tuning in after the start of a FEC block prevents, due to the temporal predictive nature of the inter frames, the decoder and media player to start decoding and rendering the media data until a next intra frame of a following FEC block.

In the upper part of FIG. 1, a user terminal tunes in to the stream 1 between inter frames $P_{23}$ and $P_{24}$. This means that the user terminal will only receive the inter frames $P_{24}$ to $P_{27}$ of the current FEC block 20. The user terminal therefore has to await the reception of the intra frame $I_3$ 32 of the next FEC block 30 before the media play-out can be initiated, which is exemplified in the lower portion of FIG. 1. The user terminal also needs to wait for a whole FEC block before decoding of packets can be performed. This is because data packets later on in the FEC block are used to repair earlier packets and one does not want to pause each time a repairable error occurs. The figure represents this by indicating tune-in and indicating the play-out occurring following buffering of a whole FEC block. The received inter frames $P_{24}$ to $P_{27}$ will, though, be unusable for the user terminal as it has not correctly received the prior frames $I_2$, $P_{21}$ to $P_{23}$ of the FEC block 20.

It is possible today with the current implementation techniques to interleave data packets. In such a case, the initial intra frame 12, 22 of the FEC block 10, 20 can be put towards the end of the FEC block 10, 20, which is illustrated in FIG. 2. Comparing FIG. 2 with FIG. 1, the order of media frames 12-16, 22-26, 32-36 inside the respective FEC blocks 10, 20, 30 have been interchanged.

Tuning-in at the same time point in the transmission order as in FIG. 1, the user terminal will now receive the inter frames $P_{21}$ to $P_{23}$ and the intra frame $I_2$ of the current FEC block 20. Thus, part of the FEC block 20 is decodable.

This interleaving, however, moves part of the tune-in delay a small distance into the sequence. Thus, frames $I_2$, $P_{21}$, $P_{22}$, $P_{23}$ are played-out as if the tune-in was at the beginning of the FEC block 20, which is illustrated in the lower part of FIG. 2. However, as the next four frames $P_{24}$ to $P_{27}$ of the FEC block 20 are not received, the frame $P_{23}$ will be displayed until, in this example, the $9^{th}$ frame $I_3$ 32 from the next FEC block 30 can be played out. As a consequence, the media data of the frame $P_{23}$ is displayed for a very long period of time, which becomes visibly unattractive to the user. This problem is further abrogated when tuning in towards the end of a FEC block implying that the delay in the continuation of the rendering can be very large, up to the length of a FEC block.

SUMMARY

The present embodiments overcome these and other drawbacks of the prior art arrangements.

It is a general objective to provide a stream of media frames that allows alternative processing of the media frames according to different rendering time schedules.

This and other objectives are met by embodiments as defined by the accompanying patent claims.

Briefly, an embodiment involves the generation of a stream comprising multiple media frames. Each of these media frames has a respective assigned default timestamp. These default timestamps define the rendering times of the media data of the media frames according to a default rendering time schedule. At least one respective alternative timestamp is assigned to at least a portion of the multiple media frames in the stream. These alternative timestamp define alternative rendering times of the media data of the media frames according to at least one alternative rendering time schedule.

Usage of alternative timestamps is especially advantageous when organizing media frames in the stream into different frame groupings and in particular organizing the media frames in a hierarchical frame transmission order in the frame groupings. When tuning into the stream at an intermediate position in such a frame grouping, i.e. missing at least one or more media frames of the frame grouping, the alternative timestamps can be used to achieve an efficient media processing even though tuning in did not occur at the start of the frame grouping. In such a case, the alternative timestamps of the media frames received for the tuned-in frame grouping are used to determine an alternative rendering time schedule for the media data of these media frames. The effect of any gaps in the media rendering that otherwise may occur due to the missed media frame or frames of the frame grouping can therefore be reduced or even be non-existent by conducting the media rendering according to the alternative timestamps instead of the traditional, default timestamps.

Embodiments also relate to devices for generating and processing media frames of a stream and to such a stream.

SHORT DESCRIPTION OF THE DRAWINGS

The embodiments together with further objects and advantages thereof, may best be understood by making reference to the following description taken together with the accompanying drawings, in which:

FIG. 1 is a schematic illustration of transmission and rendering of a stream of media frames according to the prior art;

FIG. 2 is a schematic illustration of transmission and rendering of a stream of media frames with interleaved media frames;

FIG. 4 is a schematic illustration of transmission and rendering of a stream of media frames with alternative timestamps according to an embodiment;

FIG. 5 is a schematic illustration of transmission and rendering of a stream of media frames with alternative timestamps according to another embodiment;

FIG. 8 is a flow diagram illustrating an additional optional step of the stream processing method in FIG. 7;

FIG. 9 is a flow diagram illustrating additional optional steps of the stream processing method in FIG. 7;

FIG. 10 is a flow diagram illustrating an additional optional step of the stream processing method in FIG. 7;

FIG. 11 is a flow diagram illustrating an additional optional step of the stream processing method in FIG. 7;

DETAILED DESCRIPTION

Figure 3:
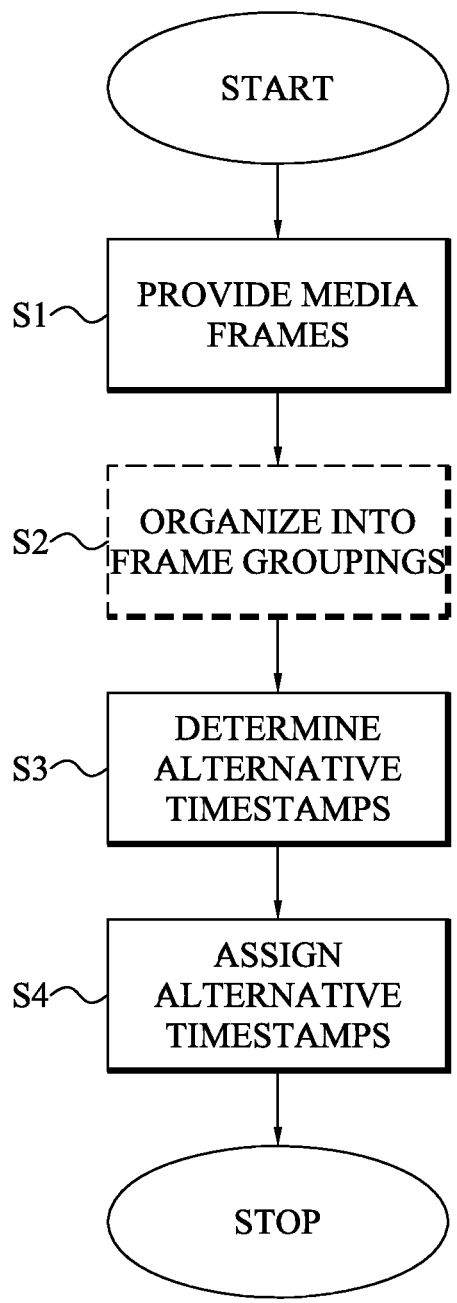
FIG. 3 is a flow diagram illustrating a method of generating a stream of media frames according to an embodiment.

Throughout the drawings, the same reference characters will be used for corresponding or similar elements.

The embodiments relate to the generation and usage of media streams comprising data packets carrying media frames. As is known in the art, such media frames or more correctly the data packets carrying the media data of the media frames comprise assigned timestamps. These timestamps are used during decoding and rendering or play out for defining a rendering or playout order and time of the media. In the prior art arrangements, each media frame has a single timestamp defining the rendering time of the media of that media frame.

The embodiments of the invention have taken a radically different approach by assigning, to at least some of the media frames in a media stream, alternative timestamps. As a consequence, each of these media frames then has multiple assigned timestamps defining different rendering times of the media in the media frame. Thus, the traditional, default timestamp defining the rendering time according to a default rendering time schedule is complemented with at least one alternative timestamp defining an alternative rendering time according to an alternative rendering time schedule.

The alternative timestamps of the media stream can be utilized by media processing terminals, such as media players, transcoders, etc., for different purposes as disclosed herein.

Media or multimedia data refers to any data that can be provided by a content provider or server to a media player for rendering of the data. Typical preferred examples include video data and/or audio data. Media data can also be in the form of scalable video data and rich media that can be processed and rendered to form different scenes, including scalable vector graphics (SVG).

A media stream according to the embodiments comprises multiple media frames, each comprising media data. Thus, such a media frame can be a video media frame carrying video data. Video media frames are traditionally classified as intra frames (I frames) or inter frames, including predicted frames (P frames) and bi-directional predicted frames (B frames). A media frame can also be an audio frame carrying audio data. In the case of scalable video data, a media frame can correspond to the base layer of the scalable video data or carry data of an additional enhancement layer applicable to the base layer. Rich media traditionally comprises scenes or random access points and so-called scene updates. A media frame can therefore also carry such scene data or scene update data.

FIG. 3 is a flow diagram illustrating a method of generating a stream of media frames according to an embodiment. The method starts in step S1 where multiple media frames are provided. This frame provision of step S1 can be implemented by fetching the media data of the frames from an accessible media memory, in which the media data previously has been entered. Alternatively, the media frames are received from some other external unit, where the media data has been stored, recorded or generated. A further possibility is to actually create the media data, such as recording a video sequence or synthetically generating the media data.

The media frames provided in step S1 have respective assigned default timestamps defining a rendering time of the media of the media frames according to a default rendering time schedule. These default timestamps are the traditional timestamps that are assigned to the media frames and are used during the processing of the media, such as decoding and rendering of the media. Generally, the media frames have a defined rendering order and time that are dictated by the default timestamps.

As is known in the art, the media data of a media frame may be housed in one or more, often consecutive in terms of transmission order, data packets. In the former case, there is a one-to-one relationship between media frame and data packet, implying that the default timestamp assigned to the media frame can be regarded as being assigned to the data packet carrying the data of the media frame or vice versa. In the latter case, all data packets carrying the data of a media frame are preferably assigned the default timestamp of that media frame. Thus, all these data packets associated with a single media frame preferably contain a notification of the same default time stamp. In the following, default or alternative timestamps are discussed as being assigned to media frames. However, this also encompasses assigning the default and alternative timestamps to data packets carrying the data of the media frames as disclosed hereinabove.

In an optional but preferred embodiment, the provided media frames with default timestamps are organized into multiple frame groupings. Such a frame grouping then comprises multiple media frames of the stream, preferably multiple consecutive, as defined by the default timestamps, media frames. A non-limiting example of such a frame grouping used in the art in connection with media streaming is the so-called forward error correction (FEC) blocks or groups. Such a FEC block comprises, in the case of video data, an intra frame followed in rendering order, as defined by the default timestamps, by a number of inter frames. FEC is a system of error control for data transmission, whereby redundancy is added to the media data and can be used by a receiver for correcting errors occurring during the data transmission and reception.

The media frames belonging to a frame grouping, such as a FEC block, are preferably organized in a hierarchical frame transmission order. In such a case, a hierarchical top frame is preferably provided at the end of the transmission order while a hierarchically bottom frame is provided at the beginning of the transmission order. This frame transmission order is different from and often not related to the rendering order of the media frames, which is defined by the assigned timestamps. In the prior art arrangement illustrated in FIG. 1, the transmission order of the media frames 22 to 26 of a frame grouping 20 coincidences with the frame rendering order. However, in FIG. 2 the transmission order of the media frames 22 to 26 of the frame grouping 20 is basically opposite to the rendering order defined by the default timestamps 40 assigned to the media frames 22 to 26. Such a hierarchical frame transmission order achieved by interleaving is generally preferred as it allows a tuning-in media player to decode and render at least a portion of the media frames 22-26 even though the tuning-in occurred somewhere after the start of the FEC block 20.

A preferred implementation therefore provides a hierarchical frame transmission order of the media frames in a frame grouping with the most important media frames last in the transmission order and the least important frames first in the transmission order. In the case of video media data and usage of FEC blocks as frame groupings, the hierarchically top frame, i.e. the most important frame of the FEC block, is generally the intra frame. Correspondingly, the hierarchically bottom frame, i.e. the least important frame of the FEC block, is generally any inter frames that are not used as reference frame for any other inter frame in the media stream. Thus, no other inter frames are predictive based on these least important media frames. As a consequence, the hierarchical frame transmission order preferably comprises the intra frame at the end, preceded by any inter frames that are used as reference frames for at least one other inter frame in the media stream and any inter frames that are not used as reference frames for any other inter frame in the media stream at the beginning of the transmission order.

In the case of scalable video media, a hierarchical top frame can be the media frame carrying the media data of the base layer. Less hierarchically important frames can be the media frames carrying additional enhancement layers. Each such less important media frame, thus, increases the frame rate of the media stream.

The above given preferred examples illustrate reverse interleaving by having a transmission order of the media frames that is basically the reverse of the default rendering order. The embodiments are, though, not limited to such reverse interleaving but any type of transmission order and interleaving could be used. For example, if there is a scene change during the frame grouping, more than one intra frame may be provided in the frame grouping. In such a case, the multiple intra frames can be placed at the end of the transmission order for the frame grouping. Alternatively, the intra frame may be placed after the scene in rendering order.

A next step S3 of the stream generating method in FIG. 1 determines a respective alternative timestamp for each media frame of at least a portion of the media frames in the stream. These alternative timestamps define an alternative rendering time of the media of the media frames according to an alternative rendering time schedule. At least a portion of the media stream therefore has at least two sets of timestamps according to different rendering time schedules.

The alternative timestamps are, in an embodiment of step S3, determined as respective time offsets relative the default timestamps assigned to the media frames. Alternatively, the alternative timestamps can be determined in step S3 as respective time offsets relative a rendering time of another media frame, in particular to another media frame of the same frame grouping. FIG. 4 illustrates this concept. In the figure, each media frame 22 to 26 of a current media grouping 20 comprises a respective default timestamp 40 defining the rendering time of the media in the frame grouping according to a default rendering time schedule. The media frames 22 to 26 also comprise a respective alternative timestamp 50. These alternative timestamps 50 are defined as time offsets relative the first media frame 26 of the frame grouping 20 according to the hierarchical frame transmission order.

Thus, the alternative timestamp assigned to the first media frame 26 in the transmission order has an offset value of zero. A next media frame $P_{26}$ in the transmission order has an offset value of one and so one. As is further described herein, these offset values can be used to provide an efficient stream tune-in without the disadvantages associated with the prior art.

The alternative timestamps determined in step S3 for the media frames can advantageously be defined based on the frame transmission order of the media frames. This is further illustrated in FIG. 4, where the values of the offsets, i.e. the alternative timestamps 50, are dependent on the relative positions of the media frames 22 to 26 in the transmission order of the FEC block 20. In this illustrative example, the offset values 50 are increased for later transmitted media frames of the FEC block 20 and with the lowest offset value 50 assigned to the first media frame 26 in the transmission order of the FEC block 20.

In the foregoing, one alternative timestamp has been assigned per media frame. The present embodiments are though not limited thereto. In clear contrast, multiple alternative timestamps can be assigned to at least a portion of the media frames in the media stream. These multiple alternative timestamps then define different alternative rendering times of the media in the media frame according to different alternative time schedules. This embodiment of using multiple alternative timestamps per media frame can be advantageous, for instance, in the case of tuning-in in order to reduce the period of awaiting the start of the media rendering as is further disclosed herein.

Returning to FIG. 3, once the alternative timestamps have been determined such as according to any of the previously disclosed embodiments, the alternative timestamps are assigned to media frames in the media stream. The alternative timestamps can be assigned to all media frames in the media stream or only a portion thereof, to all media frames of a frame grouping or only a portion thereof. The alternative timestamps assigned to media frames of a same frame grouping may be different or at least a portion thereof may be the same.

The method then ends with a generated media stream where each media frame has a respective default timestamp and at least some of the media frames have at least one respective assigned alternative timestamp.

Figure 6:
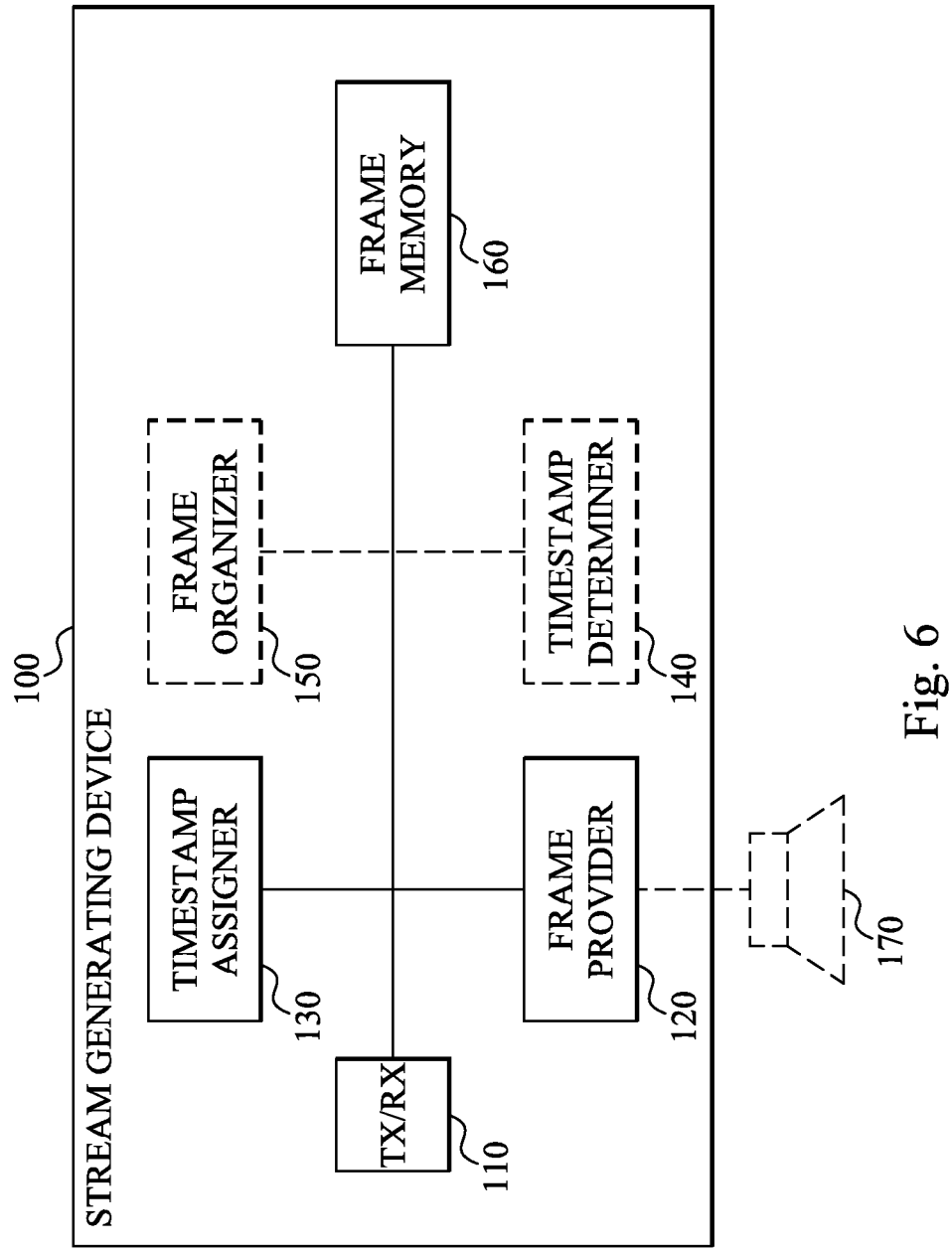
FIG. 6 is a schematic block diagram of a device for generating a stream of media frames according to an embodiment.

FIG. 6 is a schematic block diagram of a stream generating device 100 for generating a stream of media frames. The stream generating device 100 comprises a frame provider 120 implemented for providing multiple media frames, each having a respective default timestamp. The frame provider 120 can be connected to an internal or external media engine 170 that records or generates the media of the media frames. Alternatively, the frame provider 120 receives the media frames, typically in a coded form or as uncoded media data, from a connected receiver 110 of the stream generating device 100. The receiver 110 then receives the media data through a wired or wireless communication from an external terminal in the communication system. As a further alternative, the frame provider 120 can fetch the media frames or the media data to be organized into media frames from a connected frame memory 160 of the stream generating device 100.

The stream generating device 100 preferably comprises an optional timestamp determiner 140 that determines alternative timestamps for the media frames. This timestamp determiner 140 can, as has been previously mentioned, determine the alternative timestamps to be respective time offsets relative the default timestamps assigned to the media frames or time offsets relative a rendering time of another media frame in the stream. The timestamp determiner 140 may optionally determine the alternative timestamps based on a relative frame transmission order which a transmitter 110 of the stream generating device 100 uses for transmitting the media frames to one or more user terminals. The timestamp determiner 140 may determine one or more alternative timestamps for each media frame that should be assigned an alternative timestamp.

A timestamp assigner 130 assigns the determined alternative timestamps to each media frame of a least a portion of the media frames provided by the frame provider 120. The formed media frames having a default timestamp and at least one alternative timestamp may be directly sent by the transmitter 110 to one or more external units, such as transcoders, user terminals with media players, etc. Alternatively, the formed media frames can be entered in the frame memory 160 for later retrieval and transmission to the external unit or units.

An optional frame organizer 150 is implemented in the stream generating device 100 for organizing the provided and processed media frames into frame groupings, such as FEC blocks. The frame organizer 150 preferably organizes the media frames in a frame grouping in a hierarchical frame transmission order with the hierarchically top frame at the end of the transmission order and the hierarchically bottom frame at the beginning of the transmission order as previously described.

The media frames generated according to the present embodiments may be transmitted to one or more user terminals as, for example, multicast or broadcast transmissions by the transmitter 110. Alternatively, the stream generating device 100 merely generates the media frames of the media stream, while the forwarding of the media frames to user terminals is conducted by some other device of the wired or wireless communication system, in which the stream generating device 100 may be implemented.

The units 110 to 140 of the stream generating device 100 may be provided in hardware, software or a combination of hardware and software. The stream generating device 100 may advantageously be arranged in a network node of a wired or preferably wireless, radio-based communication system. The stream generating device 100 can constitute a part of a content provider or server or can be connected thereto.

Figure 7:
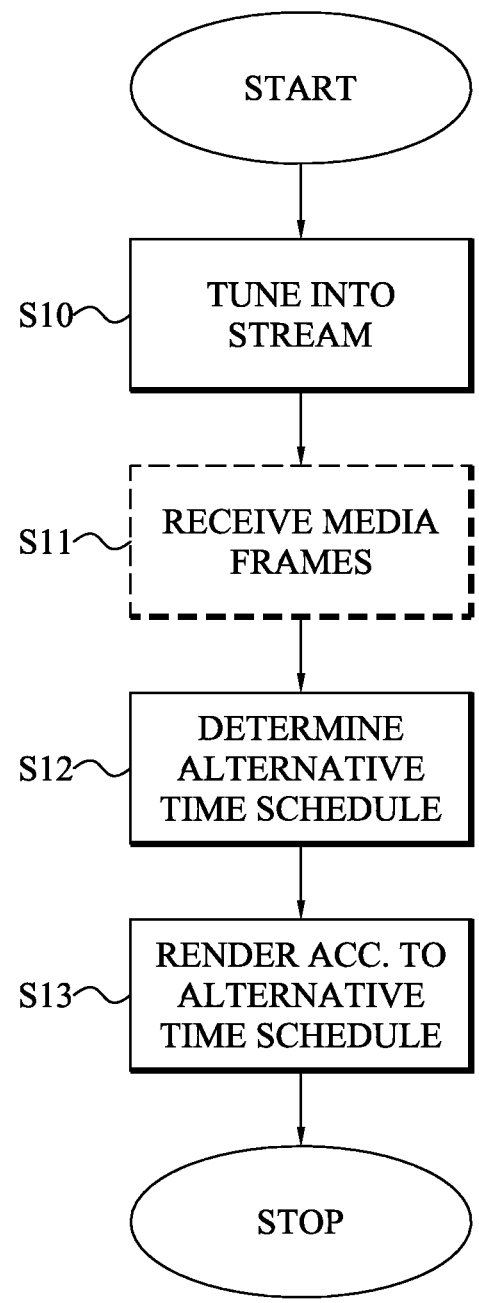
FIG. 7 is a flow diagram illustrating a method of processing a stream of media frames according to an embodiment.

FIG. 7 is a flow diagram illustrating a method of processing media frames of a media stream according to an embodiment. In this embodiment, the stream comprises multiple frame groupings, such as FEC blocks, each comprising multiple media frames. The media frames have a respective default timestamp defining the rendering time of the media data of the media frames according to the default rendering time. At least some of the media frames further comprise at least one alternative timestamp each as previously disclosed herein.

With reference to FIGS. 4 and 7, the method starts in step S10 which involves tuning into the stream 1 at an intermediate point of a frame grouping 20. The remaining frames $I_2$, $P_{21}$ to $P_{23}$ of the frame grouping 20 is received in the next step S11.

If the decoding and rendering of the media frames should have been conducted using the default timestamps 40 according to the prior art technique, the problems illustrated in the background section with reference to FIG. 2 would occur. However, in step S12 the alternative timestamps 50 of the received media frames $I_2$, $P_{21}$ to $P_{23}$ are used for determining an alternative rendering time schedule. Thus, in this case the rendering time schedule to use when defining the respective rendering times of the media frames is determined using the alternative timestamps 50 and not solely the default timestamps 40.

In the example of FIG. 4, the alternative timestamps 50 are in the form of time offsets with increasing offset values for later transmitted media frames of the frame grouping 20. Thus, the received media frames $I_2$, $P_{21}$ to $P_{23}$ of the frame grouping 20 have assigned alternative timestamp values of 7, 6, 5 and 4. In step S12 the smallest alternative timestamp value of the received media frames $I_2$, $P_{21}$ to $P_{23}$ is identified, i.e. 4 in the present case.

The next step S13 renders the received media frames $I_2$, $P_{21}$ to $P_{23}$ according to the alternative time schedule determined in step S12 based on the alternative timestamps. Thus, in this example of FIG. 4, rendering of the media frames should be started with timestamp number 5=1+4. This results in that any media data corresponding to earlier timestamps are skipped. In other words, comparing the prior art of FIG. 2 with the embodiment in FIG. 4, the rendering of the media frames $I_2$, $P_{21}$ to $P_{23}$ is started at the same play-out time but with different starting timestamps, 5 according to the embodiment and 1 according to the prior art. This alternative time schedule provides, in this embodiment, a continuous uninterrupted rendering of the media data according to timestamps 5, 6, 7, 8 of the first frame grouping 20 and then continuing smoothly into rendering media frames 32, 34 of the second frame grouping 30 without any interruption or prolonged display in the play-out.

This means that the prolonged display of the media data of one media frame $P_{23}$ once the rendering has started as in FIG. 2, is solved by the embodiment in FIG. 4. The embodiment in FIG. 4 provides a much more visually attractive solution to a viewing user as, once the media rendering has started, no interruption or unnaturally prolonged display of media data is needed. In clear contrast, the rendering runs smoothly through the media frames $I_2$, $P_{21}$ to $P_{23}$ of the current frame grouping 20 and into the media frames $I_3$, $P_{31}$ of the next frame grouping 30.

FIG. 8 is a flow diagram illustration an additional, optional step of the processing method in FIG. 7. The method continues from step S12 of FIG. 7. A next step S20 identifies a start frame among the received media frames $I_2$, $P_{21}$ to $P_{23}$ of the current frame grouping 20. In a preferred embodiment, the frame grouping 20 has a hierarchical organization of the media frames 22 to 26 with the most important, from decoding point of view, media frame at the end of the frame grouping 20 in transmission order. Thus, the start frame 22 is typically identified as the last frame $I_2$ received for the frame grouping 20. Generally, the start frame 22 is a media frame 22 from which decoding can be started without reference to any other media frame in the stream 1. The start frame 22 can therefore be an intra frame of a video stream 1 or a base layer frame of a scalable video stream 1. The start frame 22 can be identified based on information included in the media frames 22 to 26, e.g. in the headers of the media frames 22 to 26 or from the positions of the media frames 22 to 26 in a frame grouping 20.

The method continues to step S13 of FIG. 7, where the rendering of the media frames is started with the start frame and is run according to the alternative rendering time schedule.

With reference to FIGS. 4 and 9, the method continues from step S13 of FIG. 7 to step S30 of FIG. 9. This step S30 receives media frames $I_3$, $P_{31}$ to $P_{37}$ of a following frame grouping 30. The rendering of these media frames $I_3$, $P_{31}$ to $P_{37}$ is, however, typically performed according to the default time schedule in step S31. Thus, the alternative timestamps are used for the media frame $I_2$, $P_{21}$ to $P_{23}$ of the first frame grouping 20, in which the tuning in occurred after the transmission of the first media frame $P_{27}$. However, for following frame groupings 30 for which all media frames $I_3$, $P_{31}$ to $P_{37}$ are received and can be decoded and rendered, the rendering can be conducted according to the default time schedule defined by the default timestamps. Alternatively, the same time offset determined based on the alternative timestamps of the first frame grouping 20 and applied to all media frames $I_2$, $P_{21}$ to $P_{23}$ of that frame grouping 20 can also be applied to frames $I_3$, $P_{31}$ to $P_{37}$ of following frame groupings 30. Thus, the rendering time schedule for these following time groupings 30 is then defined based on the default timestamps and the determined time offset.

The loop defined by steps S30 and S31 is preferably conducted for each subsequent received frame grouping, which is schematically illustrated by the line L1.

FIG. 10 is a flow diagram illustrating an additional, optional step of the processing method in FIG. 7. The method continues from step S11 of FIG. 7.

In this embodiment, the alternative timestamps available for at least a portion of the received media frames are in the form of time offsets as illustrated above in connection with FIG. 4. A next step S40 identifies the smallest of the time offsets of the media frames received for the current frame grouping. The alternative rendering time schedule for the frame grouping is then determined at least partly based on the identified smallest time offset. In a typical implementation, the identified time offset determines the rendering start time for the start frame of the frame grouping. Thus, the identified time offset allows determination of the particular time at which the rendering of the media data of the start frame, such as I frame, of the frame grouping should be initiated by a media player.

A particular embodiment of the determination of the alternative rendering time schedule uses both the alternative timestamps and the default timestamps for defining the alternative rendering time schedule. For instance and with reference to FIG. 4, the smallest alternative timestamp 50 of the received media frames $I_2$, $P_{21}$ to $P_{23}$ in the current frame grouping 20 is four. This value can then be added to the default timestamps 40 of the received media frames $I_2$, $P_{21}$ to $P_{23}$ to get updated timestamps that define the actual rendering times of the media frames $I_2$, $P_{21}$ to $P_{23}$. In this illustrative example, the start frame 22 will therefore get a timestamp of 1+4=5 and the other following, in rendering order, media frames $P_{21}$ to $P_{23}$ get timestamps 6 to 8. The rendering of these media frames $I_2$, $P_{21}$ to $P_{23}$ is therefore started with timestamp 5.

FIG. 5 illustrates an alternative embodiment of assigning and using the alternative timestamps. Firstly, this embodiment illustrates that not all media frames 22 to 26 of a frame grouping 20 needs necessarily to have a respective alternative timestamp. When using the alternative timestamps for providing an efficient tune into the media stream 1, it might be acceptable to display the media data of one of the media frames for a few milliseconds, which occurs when tuning in shortly following after the start of the frame grouping 20 and without any assigned alternative timestamps. Thus, the problem of the prior art becomes increasingly worse the later in a frame grouping 20 a user terminal tunes in. This means that any alternative timestamps is preferably assigned to at least the last few media frames in transmission order of the frame grouping 20. However, the beneficial effects of alternative timestamps in connection with tuning-in are most efficiently utilized if all media frames or at least a major portion thereof in a frame grouping have respective assigned or associated alternative timestamps.

FIG. 5 also illustrates another difference as compared to the embodiment in FIG. 4. In FIG. 4, each media frame 22 to 26 of a frame grouping 20 has a unique alternative timestamp 50 defined based on the relative position of the media frame 22 to 26 in the frame grouping 20 according to the frame transmission order. It is actually not necessary to have unique alternative timestamps 50 for the media frames 22 to 26. In clear contrast, at least two of the media frames 22 to 26 of a frame grouping 20 can have the same assigned alternative timestamp 50.

In FIG. 5 all media frames $I_2$, $P_{21}$ to $P_{24}$ having alternative timestamps 50 have the same timestamp value. Comparing the situation in FIG. 5 with FIG. 4, a user terminal tuning in to the media stream 1 between frames $P_{24}$ and $P_{23}$ will receive the same media frames $I_2$, $P_{21}$ to $P_{23}$ as in FIG. 4. However, the smallest alternative timestamp, i.e. offset value in this example, is three and not four. The calculated timestamp of the start frame 22 is therefore 1+3=4, implying that the start timestamp is actually one point smaller than in FIG. 4. In FIG. 5 and due to the assignment of the same alternative timestamps, the media data of one of the media frames $P_{23}$ will actually be displayed for two rendering time instances before the rendering is continued with media data from the media frames 32, 34 of the following frame grouping 30. This therefore provides a somewhat inferior result as compared to FIG. 4 but is still a significant improvement as compared to the corresponding prior art case illustrated in FIG. 2. Thus, the embodiments can still provide improvements over the prior art with only assigning alternative timestamps to some of the media frames and also when assigning the same alternative timestamps to multiple media frames.

FIG. 11 is a flow diagram illustrating an alternative, optional step of the processing method in FIG. 7. The method continues from step S11 of FIG. 7.

The following additional step S50 is applicable in the case multiple alternative timestamps are assigned to the media frames. In such a case, step S50 identifies an alternative timestamp to use for each received media frame having multiple assigned alternative timestamps. Furthermore, the identification in step S50 is preferably performed at least partly based on a tuning-in position into the stream in the frame grouping. Thus, if tuning-in occurs quite early in the frame grouping respective first alternative timestamps are identified for the media frames in step S50. However, if the tuning-in instead occurred later on in the frame grouping, respective second, different alternative timestamps are preferably identified. This allows the user terminal to identify the most appropriate set of alternative timestamps for the current situation. As a consequence, a first user terminal tuning-in at a first position in a frame grouping of the media stream will therefore typically use another set of alternative timestamps as compared to a second user terminal tuning-in at a second position of the same frame grouping.

The user terminal therefore preferably uses information included in the media frames, such as the default timestamps of the media frames or other information for determining the position of the media frames in the transmission order of the frame grouping. For instance, data packets carrying media frames may include header information allowing identification of the respective packet numbers of the data packets. Any such included information can be used for determining the tuning-in position in a frame grouping and identifying a correct alternative timestamp in step S50.

The method continues to step S12 of FIG. 7, where the identified alternative timestamps are used for determining the alternative rendering schedule for the received media data.

Figure 12:
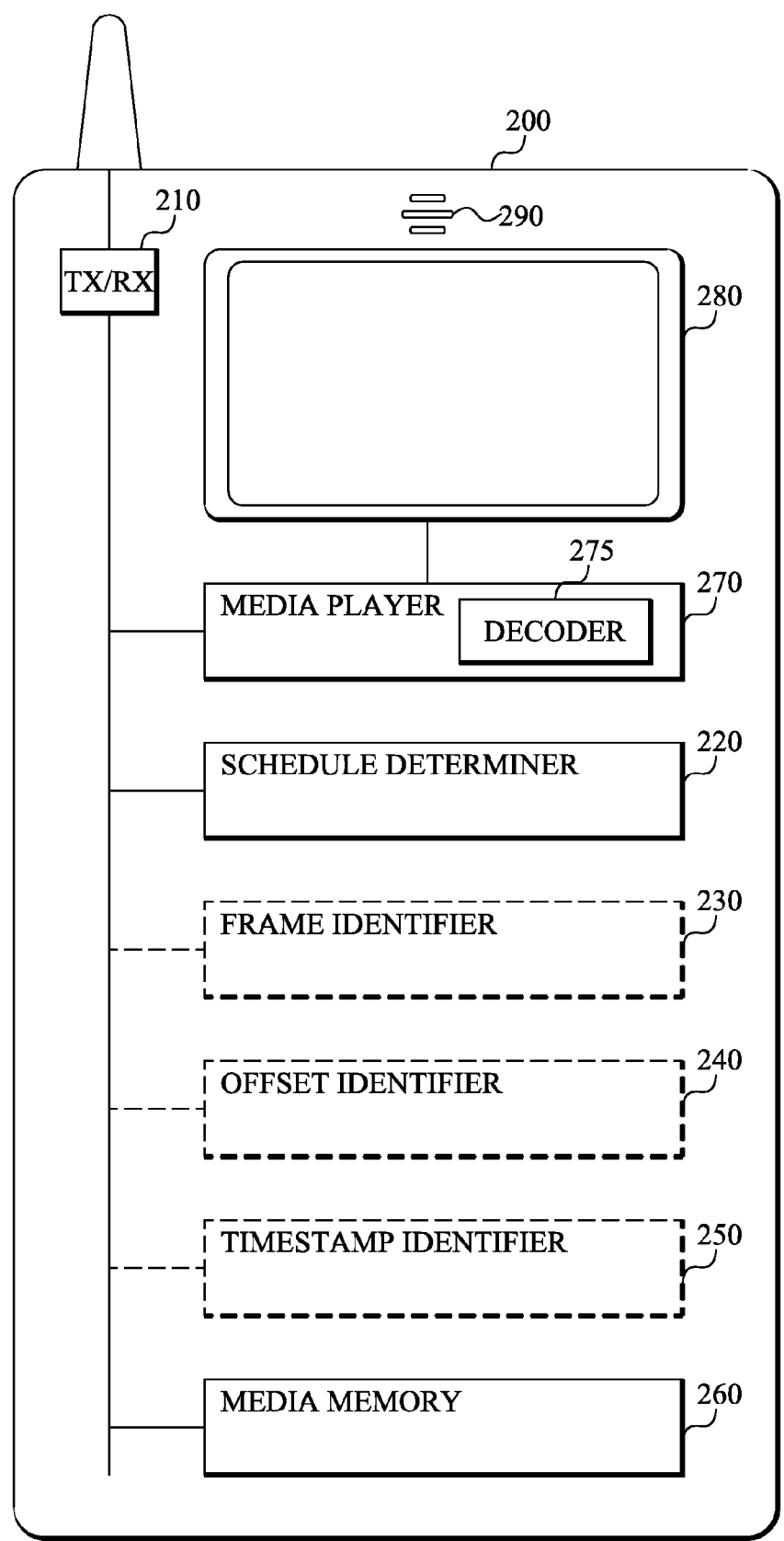
FIG. 12 is a schematic block diagram of a device for processing a stream of media frames according to an embodiment.

FIG. 12 is a schematic illustration of an embodiment of a device 200 for processing media frames. In the figure, the device 200 has non-limitedly been illustrated in the form of a user terminal having media playing functionality. Such a user terminal 200 may, for instance, be a portable user terminal of a wireless communication system, such as a mobile telephone, Personal Digital Assistance, laptop with communication equipment, etc. Other examples of user terminals that can benefit from the invention include computers, game consoles, TV decoders and other equipment adapted for processing and rendering media data. Furthermore, the device 200 does not necessarily have to be a media rendering device. In clear contrast, the device 200 could use the alternative timestamps as disclosed herein for other processing purposes. For instance, a transcoder adapted for receiving encoded media frames, decoding them and then re-encoding the media frames can use the alternative timestamps.

The device 200 comprises a receiver 210 for receiving media frames of a media stream. In an embodiment, the device 200 tunes into the media stream somewhere after the start of a frame grouping of media frames. Thus, the device 200 does not receive all media frames of the current tuned in frame grouping.

A schedule determiner 220 of the device 200 uses alternative time stamps available for at least some of the received media frames of the frame grouping for determining an alternative rendering time schedule for the received media.

In a first implementation, the schedule determiner 220 extracts the alternative timestamps from the data packets carrying the media frames. This means that the alternative timestamps are included in the same data packets that carry the media frames. In an alternative implementation, the alternative timestamps are signaled separately, i.e. not included in the media frame carrying data packets. For instance, a control channel relating to the media session involving the forwarding of media data to the device 200 could be used for separately transmitting the alternative timestamps. This can be implemented by associating each alternative timestamp with an identifier of a media frame or a data packet of an identifier of the frame position in a frame grouping to which the alternative timestamp can be applied. In such a case, the device 200 can decide whether or not to receive the alternative timestamps. This means that devices 200 having no need for usage of the alternative timestamps, for instance, by already having tuned into the stream can disregard from the reception of the alternative timestamps. The total size of the transmitted media frame packets can therefore be kept somewhat smaller than if alternative timestamps are included therein.

Still another possibility is to use alternative timestamps that are already provided at the device 200 before the reception of media frames. For instance, the alternative timestamps can be hard coded in a memory 260 of the device 200 or be received, for instance, at the initiation or set up of the media session. This embodiment is possible if the frame groupings typically have a well-defined size in terms of the number of media frames per frame grouping and if a media frame occupying a given position in a frame grouping can use the same alternative timestamp as another media frame occupying the same position but in another frame grouping. With reference to FIG. 4 where a frame grouping 20 non-limitedly has been illustrated as comprising eight media frames 22 to 26. In such a case, the first media frame 26, 36 in each frame grouping 20, 30 according to the transmission order has the same alternative timestamp, the second media frames have the same alternative timestamps and so on.

In such a case, the device 200 preferably comprises a timestamp identifier 250 for identifying at least one alternative timestamp to use when determining the alternative rendering time schedule for the received media data. The timestamp identifier 250 preferably identifies the position in the frame grouping at which the tuning into the stream occurred. The alternative timestamp of the multiple hard coded or previously provided alternative timestamps to use is then preferably determined based on this identified position.

The device 200 typically, but not necessarily as mentioned above, comprises a media player 270 that performs the actual media rendering or play out. The media player 270 comprises or has access to a decoder 275 for decoding the media frames and media data according to well-known techniques. The decoded media is rendered by the media player 270, for instance by being displayed on a display screen 280 included in or connected to the device 200. Alternatively, or in addition, media in the form of audio can be played out by a loudspeaker 290 included in or connected to the device 200.

An optional frame identifier 230 may be implemented in the device 200 for identifying a rendering start frame of the tuned in frame grouping. This start frame is typically identified based on information included in the received data packets, such as the default timestamps or information identifying the type of media frame, such as intra or inter frame, carried by the data packets. The media player 270 starts the media rendering with the data included in the identified start frame and then continues with the media rendering according to the alternative rendering time schedule determined by the schedule determiner 220.

Once all media data of the current frame grouping has been rendered, the media player 270 continues with media data from following frame groupings. However, in such a case the default timestamps included in the received media frames can be used for these subsequent media frames implying that the media rendering proceeds according to the default rendering time schedule.

In the case the alternative timestamps are defined as time offsets relative the default timestamps, the schedule determiner 220 preferably determines the alternative rendering time schedule based on both the default timestamps and the alternative timestamps assigned to the media frames.

The alternative timestamp or timestamps to use for determining the start rendering time of the received media is preferably identified by an offset identifier 240 of the device 200. The offset identifier 240 preferably identifies the smallest offset time assigned for the media frames correctly received and being decodable by the device 200 for the current frame grouping. The schedule determiner 220 uses this identified smallest offset value, optionally together with the default timestamps, for determining the alternative rendering time schedule to use by the media player 270.

The above-mentioned timestamp identifier 250 may also be used by the device 200 in the case at least some of the received media frames have multiple assigned alternative timestamps. The timestamp identifier 250 then preferably selects the alternative timestamp or timestamps that are applicable to the current case based on the tuning-in position of the device 200 in the media stream as previously described.

The units 210 to 250, 270, 275 of the device 200 may be provided in hardware, software or a combination of hardware and software.

The embodiments have mainly be described above in connection with usage of the alternative timestamps for achieving an efficient tune in and media rendering without long periods of displaying or playing out the same media data. This is, however, not the only advantageous frame processing benefiting from the alternative timestamps. As was mentioned above, the alternative timestamps can be used during media transcoding, when a transcoder device did not correctly receive all media frames of a frame grouping. Furthermore, the transcoder device can use the alternative timestamps for determining an alternative rendering time schedule for the media.

In such a case, the transcoder device may use the alternative timestamps basically in the same way as a decoder does as previously described herein. For instance, the transcoder device may choose a rendering time depending on the tune-in occasion of a frame grouping using the alternative timestamps. Correspondingly, a transcoder device may operate like an encoder by, for example, reversing the order of media frames in the frame grouping with the most important frame at the end of the frame grouping. The transcoder device then assigns each media frame an alternative timestamp, such as timestamp offset, depending on the distance of the position of media frame in the frame grouping to the end of the frame grouping.

A further example of usage of alternative timestamps is when multiple types of media are to be processed together, for instance video and audio media. In such a case, the video frames are sent in separate data packets possibly in a separate media stream as compared to the data packets carrying the audio frames. Furthermore, the video frames generally have default timestamps separate from the default timestamps assigned to the audio frames. Alternative timestamps can be used in connection with the video frames, the audio frames or both the audio and video frames for determining the media rendering time schedule of one type of media, such as video, dependent on the amount of media already received of the other type of media, i.e. audio, or vice versa. For instance, the alternative rendering time schedule of the video data can be determined by alternative timestamps assigned to the video frames based on the amount of audio data received. Thus, if the device receives 1 second of audio and the audio data is sent in decoding order, then the device determines that the video can be pushed forward with a timestamp offset of FEC block size corresponding to one 1 second. This offset, i.e. alternative timestamp, is then used by the device to adjust the video so that 1 second of video is regarded as being present. Another example is if the device knows the distance between the timestamp of a frame and the timestamp of the start frame (in display order) of the next FEC block. In this case, the device can receive, for instance, 2 seconds of video and use alternative timestamps, such as offsets, so that these 2 seconds of video are the last two seconds of a current FEC block to thereby provide a smooth transition over FEC block borders.

The alternative timestamps can also be used, for instance, for fast forward traversal through the media frames of a stream. For instance, rendering of media data of a stream can occur during the default time schedule where all media frames are rendered in due course according to the default timestamps. Alternatively, the media data of the stream is rendered according to the alternative time schedule defined by the alternative timestamps. In such a case, some of the media frames may actually be skipped as defined by the alternative timestamps to thereby "jump" between selected media frames in the stream and omitting the media data carried by other skipped media frames.

Using alternative sets of timestamps as disclosed herein may be interpreted as stating that an image can be displayed at multiple points of time according to different rendering time schedules. When choosing which image to display when fast forwarding, the media frame with the longest span of valid time can therefore be selected.

A further example of usage of alternative timestamps is to achieve an efficient navigation within the media stream. By giving a media frame an alternative time stamp, when navigating to a certain time, even during fast forwarding, the media frames are not required to be taken at exactly these times defined by the time stamps. For instance, instead of displaying times 10, 20, 30 and so on, it may be easier to decode the media frames 9, 19, 29 and so on.

Figure 13:
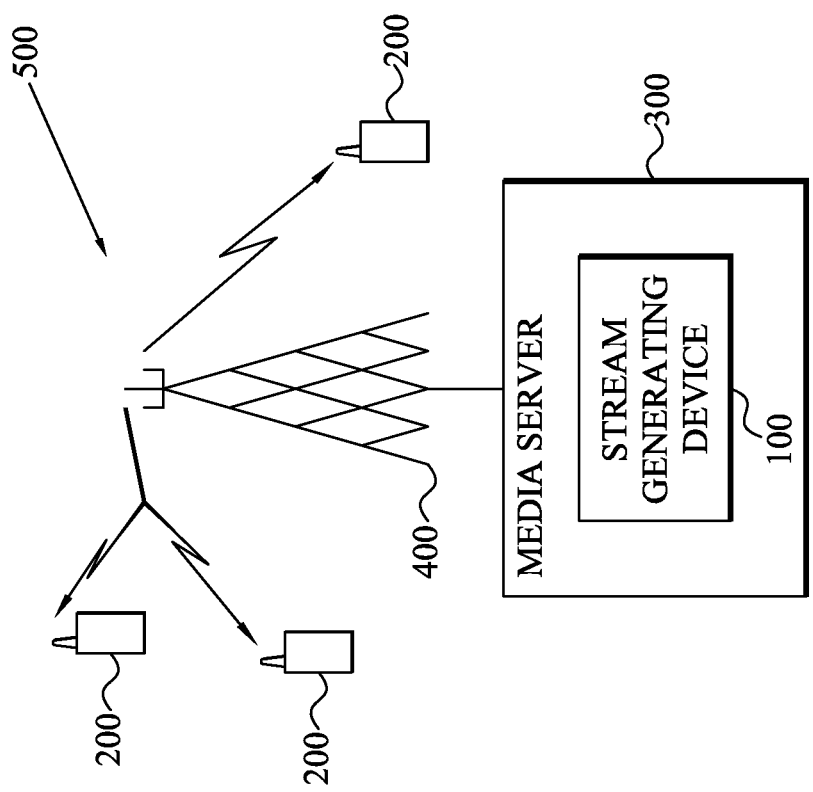
FIG. 13 is a schematic overview of a portion of a wireless communication system, in which the embodiments can be implemented.

FIG. 13 is a schematic overview of a portion of a wireless communication system 500 in which embodiments may be implemented. The communication system 500 comprises one or more network nodes or base stations 400 providing communication services to connected user terminals 200. In particular, the base station 400 communicates data packets carrying media frames having assigned default and alternative timestamps as disclosed herein. The base station 400 comprises or is connected to a media server or provider 300 comprising the stream generating device 100 described above and disclosed in FIG. 6.

The media stream may be transmitted in a unicast transmission but is typically in the form of a multicast or broadcast transmission as schematically illustrated in the figure.

It will be understood by a person skilled in the art that various modifications and changes may be made to the present invention without departure from the scope thereof, which is defined by the appended claims.

The invention claimed is:

1. A method implemented by a stream generating device for generating a stream of media frames that is to be processed by a stream processing device, the method comprising:
   providing multiple media frames at the stream generating device, each media frame of said multiple media frames having an assigned default timestamp defining a rendering time of media of said media frame according to a default rendering time schedule;
   at the stream generating device, assigning, to each media frame of at least a portion of said multiple media frames, an alternative timestamp in addition to the default timestamp assigned to that media frame, the alternative timestamp defining an alternative rendering time of said media of said media frame according to an alternative rendering time schedule, such that at any given time said media frame has assigned thereto multiple different timestamps defining multiple different rendering times of said media; and with said multiple different timestamps assigned to each of at least said portion of the multiple media frames, providing those multiple media frames for transmission to the stream processing device.

2. The method according to claim 1, further comprising organizing said multiple media frames into a frame grouping in a hierarchical frame transmission order with a hierarchically top frame at the end of said hierarchical frame transmission order and a hierarchically bottom frame at the beginning of said hierarchical frame transmission order, wherein said stream comprises multiple frame groupings.

3. The method according to claim 2, wherein said organizing comprises organizing said multiple media frames in said frame grouping in said hierarchical frame transmission order with an intra frame at said end of said hierarchical frame transmission order, preceded by any inter frames of said multiple media frames that are used as reference frames for at least one other inter frame of said multiple frames and with any inter frames of said multiple media frames that are not used as reference frames for at least one other inter frame of said multiple frames at said beginning of said hierarchical frame transmission order.

4. A stream generating device for generating a stream of media frames that is to be processed by a stream processing device, the stream generating device comprising:
a frame provider circuit for providing multiple media frames, each media frame of said multiple media frames having an assigned default timestamp defining a rendering time of media of said media frame according to a default rendering time schedule; and
a timestamp assigner circuit for assigning, to each media frame of at least a portion of said multiple media frames, an alternative timestamp in addition to the default timestamp assigned to that media frame, the alternative timestamp defining an alternative rendering time of said media of said media frame according to an alternative rendering time schedule, such that at any given time said media frame has assigned thereto multiple different timestamps defining multiple different rendering times of said media;
wherein the stream generating device is configured to, with said multiple different timestamps assigned to each of at least said portion of the multiple media frames, provide those multiple media frames for transmission to the stream processing device.

5. The device according to claim 4, further comprising a frame organizer circuit for organizing said multiple media frames into a frame grouping in a hierarchical frame transmission order with a hierarchically top frame at the end of said hierarchical frame transmission order and a hierarchically bottom frame at the beginning of said hierarchical frame transmission order, wherein said stream comprises multiple frame groupings.

6. The device according to claim 4, further comprising a timestamp determiner circuit for determining, for each media frame of said at least a portion of said multiple media frames, said alternative timestamp as a time offset relative said default timestamp assigned to said media frame.

7. The device according to claim 4, further comprising a timestamp determiner circuit for determining, for each media frame of said at least a portion of said multiple media frames, said alternative timestamp as a time offset relative a rendering time of another media frame of said multiple media frames.

8. The device according to claim 4, further comprising a timestamp determiner circuit for determining, for each media frame of said at least a portion of said multiple media frames, said alternative timestamp based on a relative transmission time of said media frame according to a frame transmission order associated with said multiple media frames.

9. A method of processing media frames of a stream of multiple frame groupings comprising multiple media frames, each media frame having a default timestamp defining a rendering time of said multiple media frames of a frame grouping according to a default rendering time schedule, said method implemented by a stream processing device and comprising:
tuning into said stream at an intermediate point of a frame grouping of said multiple frame groupings;
at the stream processing device, receiving from a stream generating device media frames of said frame grouping following said intermediate point, wherein each of at least a portion of said media frames are received with an alternative timestamp having been assigned thereto by the stream generating device in addition to the default timestamp assigned to that media frame, such that at any given time the media frame has assigned thereto multiple different timestamps defining multiple different rendering times of media of the frame; and
determining an alternative rendering time schedule for said received media frames based on at least one of said alternative timestamps, as an alternative to the default rendering time schedule associated with the default timestamps assigned to the received media frames.

10. The method according to claim 9, further comprising:
identifying a rendering start frame of said frame grouping among said received media frames; and
rendering said received media frames starting with said rendering start frame according to said alternative rendering time schedule.

11. The method according to claim 10, further comprising rendering multiple media frames of at least one following frame grouping of said stream according to the default rendering time schedule of said at least one following frame grouping.

12. The method according to claim 9, wherein said determining comprises determining said alternative rendering time schedule based on said at least one alternative timestamp and said default timestamps assigned to said received media frames.

13. The method according to claim 9, wherein said at least one alternative timestamp is a time offset and at least a portion of said multiple frames of said frame grouping has a respective assigned time offset, and wherein said determining comprises:
identifying a smallest time offset among said received media frames; and
determining said alternative rendering time schedule based on said smallest time offset.

14. A stream processing device device for processing media frames of a stream of multiple frame groupings comprising multiple media frames, each media frame having a default timestamp defining a rendering time of said multiple media frames of a frame grouping according to a default rendering time schedule, said device comprising:
a receiver for receiving from a stream generating device media frames of a frame grouping of said multiple frame groupings following an intermediate tune-in point of said frame grouping, wherein each of at least a portion of said media frames are received with an alternative timestamp having been assigned thereto by the stream generating device in addition to the default timestamp assigned to that media frame, such that at any given time the media frame has assigned thereto multiple different timestamps defining multiple different rendering times of media of the frame; and a schedule determiner circuit for determining an alternative rendering time schedule for said received media frames based on at least one of said alternative timestamps, as an alternative to the default rendering time schedule associated with the default timestamps assigned to the received media frames.

15. The device according to claim 14, further comprising:
a frame identifier circuit for identifying a rendering start frame of said frame grouping among said received media frames; and
a media player circuit for rendering said received media frames starting with said rendering start frame according to said alternative rendering time schedule.

16. The device according to claim 15, wherein said media player circuit is arranged for rendering multiple media frames of at least one following frame grouping of said stream according to the default rendering time schedule of said at least one following frame grouping.

17. The device according to claim 14, wherein said schedule determiner circuit is configured to determine said alternative rendering time schedule based on said at least one alternative timestamp and said default timestamps assigned to said received media frames.

18. The device according to claim 14, wherein said alternative timestamps are time offsets and at least a portion of said multiple frames of said frame grouping has a respective assigned time offset, wherein said device further comprises an offset identifier circuit for identifying a smallest time offset among said received media frames, and wherein said schedule determiner circuit is configured to determine said alternative rendering time schedule based on said smallest time offset.

* * * * *

UNITED STATES PATENT AND TRADEMARK OFFICE
CERTIFICATE OF CORRECTION

Page 1 of 1

PATENT NO.        : 8,831,402 B2
APPLICATION NO.   : 12/999036
DATED             : September 9, 2014
INVENTOR(S)       : Priddle et al.

It is certified that error appears in the above-identified patent and that said Letters Patent is hereby corrected as shown below:

On the title page item (75), under "Inventors", in Column 1, Line 2, delete "Torbjorn" and insert -- Torbjörn --, therefor.

In the specification

In Column 2, Line 52, delete "timestamp" and insert -- timestamps --, therefor.

In the claims

In Column 16, Line 54, in Claim 14, delete "device device for" and insert -- device for --, therefor.

Signed and Sealed this
Nineteenth Day of May, 2015

Michelle K. Lee
*Director of the United States Patent and Trademark Office*